United States Patent
Shuster et al.

(10) Patent No.: US 11,803,429 B2
(45) Date of Patent: Oct. 31, 2023

(54) MANAGING ALERT MESSAGES FOR APPLICATIONS AND ACCESS PERMISSIONS

(71) Applicant: Red Hat, Inc., Raleigh, NC (US)

(72) Inventors: Boaz Shuster, Kefar Sava (IL); Shay Shevach, Ashkelon (IL)

(73) Assignee: Red Hat, Inc., Raleigh, NC (US)

( * ) Notice: Subject to any disclaimer, the term of this patent is extended or adjusted under 35 U.S.C. 154(b) by 274 days.

(21) Appl. No.: 17/085,898

(22) Filed: Oct. 30, 2020

(65) Prior Publication Data

US 2022/0138023 A1    May 5, 2022

(51) Int. Cl.
*G06F 9/54* (2006.01)
*G06F 21/62* (2013.01)
*G06F 11/36* (2006.01)
*G06F 16/22* (2019.01)

(52) U.S. Cl.
CPC .......... *G06F 9/542* (2013.01); *G06F 11/3612* (2013.01); *G06F 16/2246* (2019.01); *G06F 21/629* (2013.01)

(58) Field of Classification Search
CPC .. G06F 9/542; G06F 11/3612; G06F 16/2246; G06F 21/629
See application file for complete search history.

(56) References Cited

U.S. PATENT DOCUMENTS

| 6,339,832 | B1* | 1/2002 | Bowman-Amuah ... G06F 9/542 710/48 |
| 9,575,979 | B1* | 2/2017 | McClintock .......... G06F 21/604 |
| 9,595,601 | B2 | 3/2017 | Miyamae et al. |
| 9,626,283 | B1* | 4/2017 | Zlatnik ............... G06F 11/3664 |
| 9,785,799 | B2 | 10/2017 | Sreedhar |
| 10,992,780 | B1* | 4/2021 | Rudrappa Goniwada .................... H04L 63/1425 |
| 2012/0072968 | A1* | 3/2012 | Wysopal ............... G06F 21/577 726/1 |
| 2014/0122941 | A1* | 5/2014 | Pan ........................ G06F 11/328 714/45 |

(Continued)

FOREIGN PATENT DOCUMENTS

| KR | 101987664 B1 | 6/2019 |
| WO | 2020017847 A1 | 1/2020 |

OTHER PUBLICATIONS

Azure Strategy and Implementation Guide; Microsoft Corporation; pub date: 2018; https://www.arbelatech.com/insights/white-papers/microsoft-azure-strategy-and-implementation-guide.

(Continued)

*Primary Examiner* — S. Sough
*Assistant Examiner* — Zheng Wei
(74) *Attorney, Agent, or Firm* — Womble Bond Dickinson (US) LLP

(57) ABSTRACT

Managing alert messages and access permissions for applications. In one embodiment, a method is provided. The method includes determining that one or more errors have occurred in a set of applications executing in a set of containers. The method also includes identifying a set of users in view of one or more of the set of containers and a set of files for the set of applications. The method further includes sending, via a set of messaging systems, a set of messages to the set of users to indicate that the one or more errors have occurred in the set of applications.

20 Claims, 6 Drawing Sheets

(56) References Cited

U.S. PATENT DOCUMENTS

| | | | |
|---|---|---|---|
| 2014/0201247 A1* | 7/2014 | Kirazci | G06F 16/9027 |
| | | | 707/803 |
| 2016/0274997 A1* | 9/2016 | Kachko | G06F 11/0748 |
| 2017/0060718 A1* | 3/2017 | Schultz | G06F 11/0712 |
| 2018/0218148 A1* | 8/2018 | D'Errico | G06F 16/245 |
| 2018/0300186 A1* | 10/2018 | Grantham | G06F 16/258 |
| 2019/0327271 A1 | 10/2019 | Saxena et al. | |
| 2020/0042366 A1* | 2/2020 | Ganesh | G06F 9/545 |

OTHER PUBLICATIONS

Configuring only a Subset of Clusters; Google https://cloud.google.com/anthos-config-management/docs/how-to/clusterselectors.
Using RBAC Authorization; The Linux Foundation; pub date: 2020 https://kubernetes.io/docs/reference/access-authn-authz/rbac/.

* cited by examiner

MANAGING ALERT MESSAGES FOR APPLICATIONS AND ACCESS PERMISSIONS

TECHNICAL FIELD

Aspects of the present disclosure relate to identifying users associated with particular application components, and more particularly, to contacting those individuals upon the occurrence of errors in the particular application components.

BACKGROUND

Applications may be used by users for various purposes. For example, an application may be installed and/or executed on a computing device (e.g., a tablet computer, a smartphone, a laptop computer, a desktop computer, etc.) of a user to perform various functions, actions, operations, etc. Examples of an application may include, but are not limited to a messaging application, a video application, a social networking application, a video sharing application, a photo sharing application, a chat application, a content (e.g., video, music, etc.), a delivery application, a forecasting application, a modeling application, a data analysis application, or any combination of such applications. A larger, more complex application may be divided into multiple applications components (e.g., multiple other applications, sub-applications, etc.). The different application components may execute on one or more computing devices (e.g., server computers).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
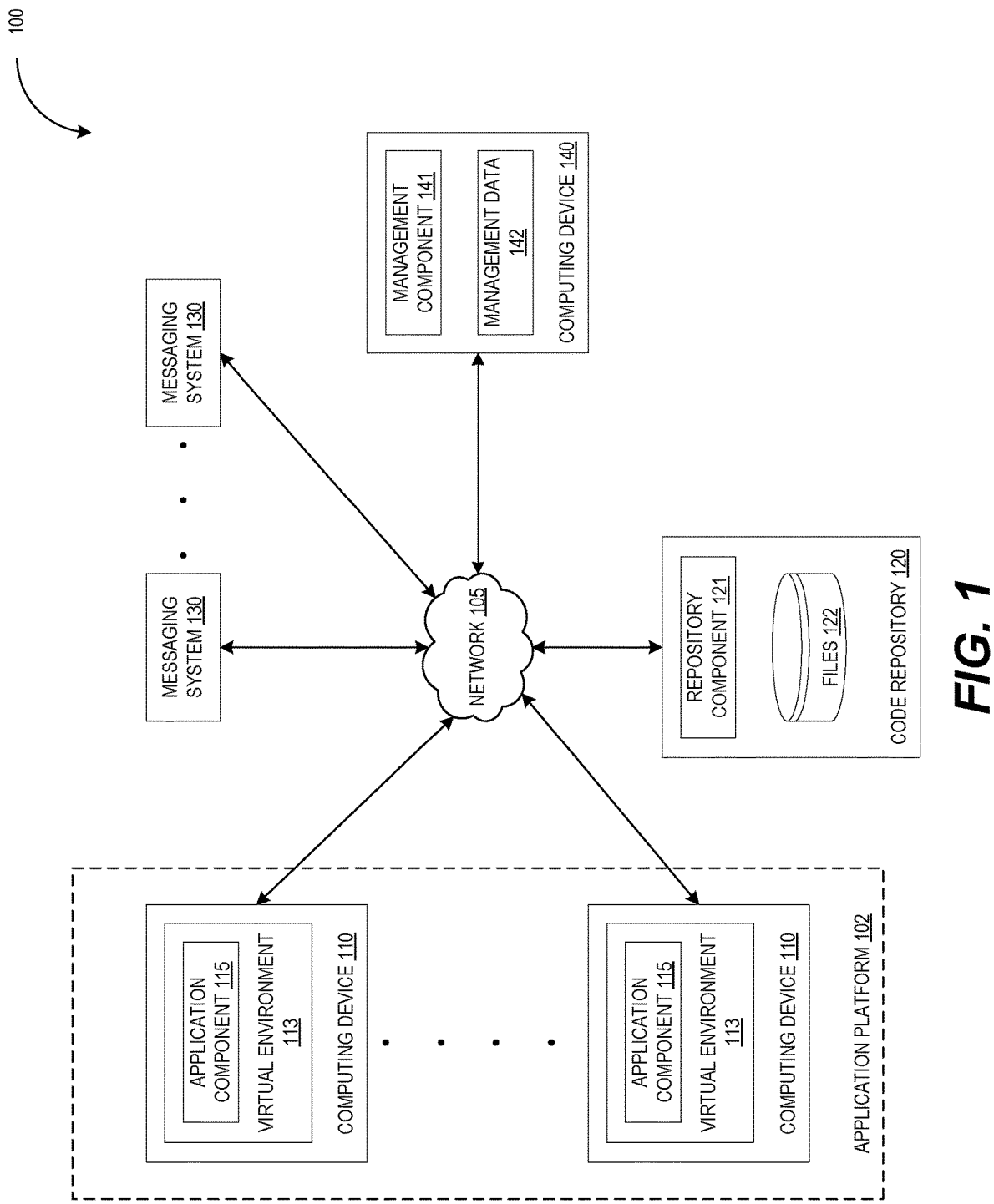
FIG. 1 is a block diagram that illustrates an example system architecture, in accordance with some embodiments of the present disclosure.

As discussed above applications may be used by users for various purposes. For example, an application may be installed and/or executed on a computing device (e.g., a tablet computer, a smartphone, a laptop computer, a desktop computer, etc.) of a user to perform various functions, actions, operations, etc. Examples of an application may include, but are not limited to a messaging application, a video application, a social networking application, a video sharing application, a photo sharing application, a chat application, a content (e.g., video, music, etc.), a delivery application, a forecasting application, a modeling application, a data analysis application, or any combination of such applications. A larger, more complex application may be divided into multiple applications components (e.g., multiple other applications, sub-applications, etc.). The different application components may execute on one or more computing devices (e.g., server computers) and/or one or more virtual environments (e.g., containers, virtual machines, etc.).

As the application components (e.g., applications) execute, errors may occur. For example, an application component may crash, may restart, may not perform an action, function, task, etc., properly, and/or may encounter some other type of error. Resolving these errors quickly and/or efficiently may be useful to users of the application components. For example, if a user experiences an error while using an application component, it may be useful to resolve the error (e.g., fix the error, fix the application component, etc.) quickly and/or efficiently to allow the user to continue using the application component.

Identifying the appropriate people to contact regarding an error may be difficult task and/or time consuming task. For example, a system administrator is often the first person that is contacted regarding an error in an application component. However, the system administrator may not have programmed and/or created the application component. Instead, the system administrator may be responsible for managing the computing devices used by the application component. Once the system administrator is contacted, the system administrator may forward the errors to another user who may forward the errors to additional users while trying to find a person that is able to address the errors in the application components.

The embodiments, examples, implementations, etc., disclosed herein provide a management component which may detect when errors occur an application component. The management component may identify users based on the files (e.g., source code files) for the application. For example, the management component may automatically identify users (e.g., programmers) who have modified, edited, etc., the source code files for the application component based on various criteria/parameters (e.g., based on the number of edits, size of edits, time of the edits, etc.). These users are likely to be the people who are able to address (e.g., fix) the errors that are occurring in the application component. The management component may also automatically determine contact information and may alert the users using various types of messaging systems (e.g., email, chat message, text message, etc.). The management component may simplify and/or automate the process of alerting the appropriate user/people when an error occurs in an application component. Additionally, the management component may also determine permissions to virtual environments and/or computing devices for the users. For example, the management component may analyze the types of files accessed by users and may automatically determine sets of permissions for the users based on the types of files. This may also simplify and/or automate the process of setting up permissions for different users to virtual environments and/or computing devices.

FIG. 1 is a block diagram that illustrates an example system architecture 100. As discussed above, an application may perform various actions, operations, functions, methods, calculations, etc., for users and/or computing devices. For example, an application may collect data, analyze data, etc. In one embodiment, an application may be divided into multiple application components 115. Each application component 115 may perform different functions, operations, actions, processes, methods, etc., for an application and/or may provide different services, functionalities, and/or resources for the web application. For example, a first application component 115 may allow users to access various databases and a second application component 115 may allow users to update customer records. The system architecture 100 may host one or more applications. For example, different application components 115 of different applications may be located on and/or may execute on different computing devices 110 of the application platform 100, as discussed in more detail below. In another example, a virtual environment 113 may include multiple application components 115. In another embodiment, each application component 115 may be an application. For example, each application component 115 may be an independent/stand-alone application that may operate in conjunction with other application component 115.

As illustrated in FIG. 1, the system architecture 100 includes a network 105, application platform 102, code repository 120, messaging systems 130, and computing device 140. The application platform 102 includes computing devices 110. The application platform 102, computing devices 110, code repository 120, and computing device 140 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. In some embodiments, the network 105 may be a L3 network. The network 105 may carry communications (e.g., data, message, packets, frames, etc.) application platform 102, computing devices 110, code repository 120, messaging systems 130, and computing device 140.

Each computing device (e.g., each computing device 110, computing device 140, etc.) may include hardware such as processing devices (e.g., processors, central processing units (CPUs), programmable logic devices (PLDs), etc.), memory (e.g., random access memory (e.g., RAM), storage devices (e.g., hard-disk drive (HDD), solid-state drive (SSD), etc.), and other hardware devices (e.g., sound card, video card, etc.). The computing devices 110 and 140 may comprise any suitable type of computing device or machine that has a programmable processor including, for example, server computers, desktop computers, laptop computers, tablet computers, smartphones, set-top boxes, etc. In some examples, the computing devices 110 and 140 may comprise a single machine or may include multiple interconnected machines (e.g., multiple servers configured in a cluster). The computing devices 110 and 140 may each execute or include an operating system (OS). The OSs of computing devices 110 and 140 may manage the execution of other components (e.g., software, applications, etc.) and/or may manage access to the hardware (e.g., processors, memory, storage devices etc.) of the computing devices 120 and 140. The OSs of the computing devices 120 and 140 may also be referred to as host OSs.

In one embodiment, the virtual environment 113 may be a container executing on a computing device 110. A container may be an isolated set of resources allocated to executing an application, software, and/or process independent from other applications, software, and/or processes. A host OS of the computing device 110 may use namespaces to isolate the resources of the containers from each other. In another embodiment, the container may be a virtualized object similar to virtual machines. However, container may not implement a separate guest OS (e.g., like a virtual machine (VM)). The container may share the kernel, libraries, and binaries of the host OS with other containers that are executing on the computing device 110. Although FIG. 1 illustrates one container (e.g., one virtual environment 113), the computing device 110 may include multiple containers in other embodiments. Each container may have one or more respective filesystems, memories, devices, network ports, etc., for accessing the physical resources of the computing device 110.

In one embodiment, the computing device may include a container engine. The container engine may allow different containers to share the host OS (e.g., the OS kernel, binaries, libraries, etc.) of the computing device 110. For example, the container engine may multiplex the binaries and/or libraries of the host OS between multiple containers. The container engine may also facilitate interactions between the container and the resources of the computing device 110. For example, the container engine may manage requests from a container to access a memory (e.g., a RAM) of the computing device 110. In another example, the container engine may manage requests from the container to access certain libraries/binaries of the host OS. In other embodiments, the container engine may also be used to create, remove, and manage containers. In one embodiment, the container engine may be a component of a host operating system. In another embodiment, container engine may run on top of a host operating system, or may run directly on host hardware without the use of a host operating system.

In one embodiment, the virtual environment 113 may be a VM executing on a computing device 110. In one embodiment, the VM may be a software implementation of a machine (e.g., a software implementation of a computing device) that includes its own operating system (referred to as guest OS) and executes application programs, applications, software. VM may be, for example, a hardware emulation, a full virtualization, a para-virtualization, and an operating system-level virtualization VM. The VM may execute guest software that uses an underlying emulation of the physical resources (e.g., virtual processors and guest memory).

Computing device 110 may include a hypervisor, which may also be known as a virtual machine monitor (VMM). In the example shown, hypervisor may be a component of a host operating system. In another example, hypervisor may run on top of a host operating system, or may run directly on host hardware without the use of a host operating system. Hypervisor may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor may present other software (i.e., "guest" software) the abstraction of one or more virtual machines (VMs) that provide the same or different abstractions to various guest software (e.g., guest operating system, guest applications).

In one embodiment, the code repository 120 includes a repository component 121 and files 122. The code repository 120 may be one or more systems that control and/or manage changes to the files 122. For example, the repository component 121 (e.g., hardware, software, firmware, processing logic, or a combination thereof) may track different changes and/or versions of files 122 (e.g., track different versions of source code files). The repository component 121 may allow users to access files, check out files, and check in files. The repository component 121 may track the different users that access the files 122. The repository component 121 may also track the changes that are made to the files 122. The files 122 may be stored on or more data stores. A data store may be a persistent storage that is capable of storing data. A persistent storage may be a local storage unit or a remote storage unit. Persistent storage may be a magnetic storage device (e.g., a hard disk drive (HDD), optical storage device (e.g., a Blu-Ray device), solid state storage device (e.g., a solid state drive (SSD), flash memory, etc.), or any other device capable of store data. Persistent storage may also be a monolithic/single device or a distributed set of devices. The persistent storage may be configured for long-term storage of data and may retain data between power on/off cycles.

In one embodiment, the management component 141 may alert users when one or more errors occur in the application component 115. For example, based on the errors, the management component 141 may identify which users should be alerted (e.g., contacted) about the errors. The management component 141 may also assign different sets of permissions to different users. The management component 141 may alert users and/or assign different sets of permissions based on the files (e.g., the types of files) that are edited by the users. For example, the management component 141 may perform role based access control (RBAC) functions. In some embodiments, the management component 141 may identify users and/or alert the users automatically based on the files 122 (e.g., based on which users made changes to the files 122). In other embodiments, the management component 141 may automatically determine permissions for users based on the files 122 (e.g., based on the types of files 122 that the user accesses).

In one embodiment, the management component 141 may determine that one or more errors (e.g., a set of errors) have occurred in one or more applications (e.g., a set of applications) that are executing in virtual environments 113 of the computing devices 110 of the application platform 102. As discussed above, the virtual environments 113 may be containers, virtual machines, etc., and the various application components 115 (e.g., portions/components of an application or full applications), may execute within the virtual environments 113. While the application components 115 execute in the virtual environments 113, errors may occur. For example, an application component 115 may crash, experience errors, fail to perform operations, etc.

In one embodiment, the management component 141 may determine that one or more errors have occurred by receiving a message (e.g., a packet, frame, or other data) indicating that the error has occurred while executing the application components 115. For example, the application component 115 may transmit a message to the management component 141 to indicate that an error has occurred while the application component 115 was executing. In another example the application component 115 may transmit an error log (e.g., a log file) with information about the error that occurred while the application component 115. The message (received by the management component 141) may be generated by the application component 115.

In one embodiment, the management component 141 may determine that one or more errors have occurred by detecting and/or analyzing error logs that may be generated by the application component 115. For example, the management component 141 may periodically analyze one or more directories, locations, etc., within a virtual environment 113 or a computing device 110 where an application component 115 may generate and/or store error logs. The presence of an error log in a directory/location may indicate that an error has occurred in an application component 115.

In one embodiment, the management component 141 may determine that one or more errors have occurred by receiving a message from another computing device (e.g., a client device that may access and/or user an application component 115) and/or a user. For example, when a user and/or computing device uses an application component 115 and an error occurs, the computing device and/or user may transmit a message to the management component 141 to indicate that an error has occurred during the execution of an application component 115. The message may also include other data/information. For example, the message may include an identifier for the application component 115 where the error occurred, the virtual environment 113 where the application component 115 is located, and/or one or more error stacks, error traces, stack traces, exceptions, exception traces, exception stacks, etc., that may indicate a chain, series, list, etc., of files that lead to the error.

In one embodiment, the management component 141 may identify a set of users based on one or more of a set of files for the application components 115 (e.g., source code files) and the virtual environments 113 where the application components 115 are located. For example, the management component 141 may identify (e.g., determine) a set of users based on files 122 that are in the code repository 120. In another example the management component 141 may identify the set of users based on which computing devices 110 and/or which virtual environments are executing the application components 115.

In one embodiment, the management component 141 may identify one or more files 122 (e.g., a set of files) for an application component 115, based on one or more errors that have occurred for the application component 115. For example, an application component 115 may generate one or more error logs, error messages, etc., when an error occurs. The management component 141 may receive and/or access the error logs, as discussed above. The error logs may indicate one or more files for the application component 115. The error logs may also include error stacks, error traces, stack traces, exceptions, exception traces, exception stacks, etc., that may indicate a chain, series, list, etc., of files that lead to the error.

In one embodiment, the management component 141 may identify a set of users based on the one or more source files that were identified based on the one or more errors. For example, the error logs may indicate one or more files 122, as discussed above. The management component 141 may query code repository 120 for a list of users that have modified the set of files. For example, the management component 141 may transmit one or more messages to the repository component 121 to request a list of users (e.g., a first set of users) that have modified the one or more files 122. The repository component 121 may transmit one or more messages (e.g., responses) that include the list of users. The management component 141 may identify the set of users based on the list of users. For example, the management component 141 may identify (e.g., select, determine, etc.) a subset of the list of users (e.g., a subset of the first set of users).

In one embodiment, the management component 141 may identify a set of users from a list of users that have modified one or more files 122 based on a number of edits that the set of users have made to the one or more files 122. For example, a file may be for an application component 115 (e.g., may be used to compile, build, etc., application component 115). A user may edit (e.g., modify, change, update, etc.) the file 122 a user (e.g., a computing device of the user) by checking out the file 122 from the code repository 120 via the repository component 121. The user may edit the file 122 (e.g., may add code, remove code, change code, etc.) and may check the edited (e.g., updated, modified, changed, etc.) file 122 back into the code repository 120 (e.g., check in the file 122) via the repository component 121. The repository component 121 may track (e.g., count, monitor, etc.) the number of times the user has edited the file 122. For example, each time a user checks out, edits, and checks in a file 122, the repository component 121 may increment a counter associated with the user and the file 122. There may be multiple counters associated with a file 122, each counter associated with different users who have edited the file 122. The management component 141 may identify the set of users (from a list of users who have edited the file 122) based on the counters associated with the users who have edited the file 122. For example, the management component 141 may identify users who have a counter that is greater than a threshold number (e.g., users who have edited the file 122 more than a threshold number of times). In another example, the management component 141 may identify the users who have the highest number of edits to the file 122. For example, the management component 141 may identify the top/highest five, ten, or other appropriate number of users that have the highest number of edits to the file 122.

In one embodiment, the management component 141 may identify a set of users from a list of users that have modified one or more files 122 based on the amount of edits that the set of users have made to the one or more files 122. As discussed above, a user may check out a file 122 to edit (e.g., modify, update, change, etc.) the file 122. The repository component 121 may track (e.g., count, monitor, etc.) the number amount (e.g., size) of the edits to the file 122. For example, each time a user checks out, edits, and checks in a file 122, the repository component 121 may use a size counter to track the amount of changes that the user made to the file 122 (e.g., the number of lines changed, the change in file size, etc.). There may be multiple size counters associated with a file 122, each size counter associated with different users who have edited the file. The management component 141 may identify the set of users (from a list of users who have edited the file 122) based on the size counters associated with the users who have edited the file. For example, the management component 141 may identify users who have a size counter that is greater than a threshold (e.g., users who have made edits to the file 122 that are larger than a threshold size). In another example, the management component 141 may identify the users who have the highest/largest amount of edits to the file 122. For example, the management component 141 may identify the top/highest five, ten, or other appropriate number of users that have the largest amount (e.g., size) of edits to the file 122.

In one embodiment, the management component 141 may identify a set of users from a list of users that have modified one or more files 122 based on time periods when edits were made to one or more files 122. For example, the management component 141 may identify users who have edited a file 122 within the last day, week, month, or some other appropriate period of time. In another example, the management component 141 may identify a set of users who have modified one or more files 122 since the last time the file 122 was used to generate, build, compile, etc., an application component 115.

In one embodiment, the managing component 141 may send (e.g., transmit) one or more messages (e.g., a set of users) to one or more users (e.g., a set of users) to indicate that one or more errors have occurred in one or more application components 115. For example, the managing component 141 may alert one or more users that one or more errors have occurred in one or more application components 115. The managing component 141 may communicate with one or more messaging systems 130 to alert users that one or more errors have occurred in one or more application components. For example, different users may use different messaging systems 130 to communicate messages. Examples of messaging systems 130 may include chat systems, email systems, text messaging systems, etc. The management component 141 may transmit a message to each user in the set of users (to alert the user about one or more errors in an application component 115) via the appropriate messaging system 130 for the user. For example, some users may prefer email messages (e.g., may prefer to use an email system) and other users may prefer text messages.

In one embodiment, the management component 141 may use management data 142 to determine which messaging system 130 to use for different users and/or to determine contact information for the different users. For example, the management data 142 may include contact information for various users (e.g., programmers, system administrators, network administrators, etc.). The management component 141 may access the management data 142 to determine contact information such as email addresses, phone numbers, user names, user handles, etc., for different users. The management component 141 may send messages to users based on the contact information in the management data 142. For example, the management component 141 may use an email address indicated in the management data 142 to send the user an email message to alert them that one or more errors have occurred in an application component 115.

In one embodiment, the management data 142 may also include one or more priorities and/or preferences for different messaging systems 130 for a user. For example, the management data 142 may indicate that two messaging systems 130, an email system and a text message system, may be used to contact/alert a user. The management data 142 may indicate that the user prefers to use the email system, even though the management data 142 may include contact information for both the email system (e.g., an email address) and the text message system (e.g., a phone number). The management component 141 may transmit messages to the users based the order priority indicated in the management data. For example, the management component 141 may transmit a message to a user using an email system first. If not response is received within a period of time, the management component 141 may transmit a second message using a text messaging system.

In one embodiment, the management data 142 may include a YAML file that may include the names and/or identification for users (e.g., usernames, user handles, etc.), contact information for the users (e.g., email address, phone numbers, screen names, etc.), and/or priorities/preferences of which messaging systems 130 to user for which users. In other embodiments, the information (e.g., usernames, contact information, priorities/preferences, etc.) may be stored in other formats. For example, various markup language formats (e.g., extensible format language (XML)) may be used.

In one embodiment, the management data 142 may also indicate which users should be alerted, contacted, messaged, etc., based on the different files 122. For example, the files 122 may be stored in the code repository 120 in different directories. The folders, locations, etc., where the files 122 are stored may be referred to as a directory structure, a directory tree, a file tree, etc. The management component 141 may analyze the folders/locations/directories and may generate a trie data structure to represent the different folders/locations/directories, as discussed in more detail below. For example, each node in the trie data structure may represent a directory/folder and/or a file 122. The trie data structure may be included in the management data 142. The nodes in the trie data structure may also include additional data (e.g., metadata) that may indicate which users have modified a file 122, a directory/folder, etc. For example, each node in the trie data structure may include additional data and/or metadata that may indicate (e.g., identify) users who have modified a file 122 since the file 122 was last used to generated (e.g., compile, build, etc.) an application component 115. The trie data structure may be part of the management data 142 or may be stored separate from the management data 142.

In one embodiment, portions and/or all of the management data 142 may be stored on a different storage device and/or computing device. For example, the contact information (e.g., email addresses, phone numbers, etc.) may be stored on a different server computer. The server computer may be a more secure computing device that may encrypt the management data 142 (or portions of the management data 142) to prevent unauthorized access to the management data 142. The server computer may request authentication (e.g., request a username, password, other security credentials, etc.) when a request is received to access the management data 142 (or portions of the management data 142).

In one embodiment, the management component 141 may generate and/or update the trie data structure when one or more application components 115 are generated, built, compiled, etc. For example, users may modify, update, edit, etc., files 122 to update an application component 115. The updates to the application component 115 may be to add new features to the application component 115, optimize the application component 115, fix errors, problems, bugs, etc., in the application component 115, and/or for any other purpose. When a user (e.g., a system administrator, a build master, a developer, etc.) generates (e.g., builds, compiles, etc.) the application component 115, the management component 141 may generate and/or update the trie data structure. For example, if new files 122 and/or directories have been added to the code repository 120, the management component 141 may In one embodiment, users may be granted, given, provided, etc., different permissions for the computing devices 110 and/or the virtual environments 113. The permissions may allow users to access and/or modify the virtual environments 113, based on the different types of permissions. For example, a read permission may allow a user to access and/or read the contents of a virtual environment 113. In another example, an execute permission may allow a user to execute an application component 115 within the virtual environment 113. In a further example, write permissions may allow a user to modify one or more of a virtual environment 113 and a computing device 110. The permissions described herein (e.g., read, write, execute, full, etc.) are merely examples of different types of permissions. Other permissions may be used in other embodiments.

In one embodiment, the management component 141 may determine one or more permissions for accessing the virtual environments 113 and/or computing devices 110, based on one or more files 122 identified (e.g., determined by the management component 141). As discussed above, users may access different files 122. Users may check out the files 122, edit the files 122, and check the files 122 back into the code repository 120. The management component 141 may identify and/or analyze the files 122 that are accessed (e.g., checked out, edited, etc.) by different users. The management component 141 may determine different sets of permissions to the virtual environments 113 and/or the computing devices 110 for the users based on the files 122 accessed by the users.

In one embodiment, the management component 141 may analyze the types of files 122 that are accessed by users to determine which permissions should be granted to the users for which computing devices 110 and/or virtual environments 113. For example, if a user is accessing files 122 for a particular application component 115, the management component 141 may determine that the user a developer (e.g., a coder, programmer, etc.) that is working on the particular application component 115 because the files 122 are used to build, generate, compile, etc., the particular application component 115. The files 122 may be source code files (e.g., a type of file) that is used to generate, build, compile, etc., the particular application component 115. The management component 141 may provide the user with permissions that grant full access to the computing device 110 and/or the virtual environment 113 where the application component 115 is located (e.g., is deployed, installed, etc.). However, the management component 141 may not grant the user permissions to access other computing devices 110 and/or virtual environments. In another example, another user may access scripts, configuration files, parameters files, and/or other types of files that may be used to manage the computing devices 110 and/or setup/configure virtual environments 113. The management component 141 may determine that the other user is a system administrator, network administrator, etc., that is responsible for setting up and configuring computing devices 110 and/or virtual environments 113 for other users (E.g., developers, coders, etc.). The management component 141 may provide the other user with permissions that grant full access to the computing devices 110 and/or the virtual environments 113 because the management component 141 may determine that the other user is a system administrator. The management component 141 may assign different sets of permissions to different users after the management component 141 determines which sets of permissions (to the virtual environments 113 and computing devices 110) should be granted to which users.

In one embodiment, the management component 141 may perform role based access control (RBAC). As discussed above, the management component 141 may determine a role, function, etc., performed by a user based on the types of files 122 that the user accesses. For example, the management component 141 may determine that the user is a programmer (e.g., a first type of role) or a system administrator (e.g., a second type of role). Based on the different types of roles, the management component 141 may determine different sets of permissions that should be granted to different users. For example, a programmer may be provided read and execute access to a particular set of computing devices 110 while a system administrator may be provided full access to all of the computing devices 110.

In one embodiment, the management component 141 may manage the permissions for the users to the application platform 102. For example, the management component 141 may grant/revoke permissions for different users to the application platform 102. In another embodiment, a separate access control system may manage the permissions to the application platform 102. For example, the management component 141 may transmit one or more messages to the access control system to indicate different sets of permissions for different users. The access control system (not illustrated in the figures) may grant (e.g., provide) the users with the different sets of permissions indicated by the management component 141.

Figure 2:
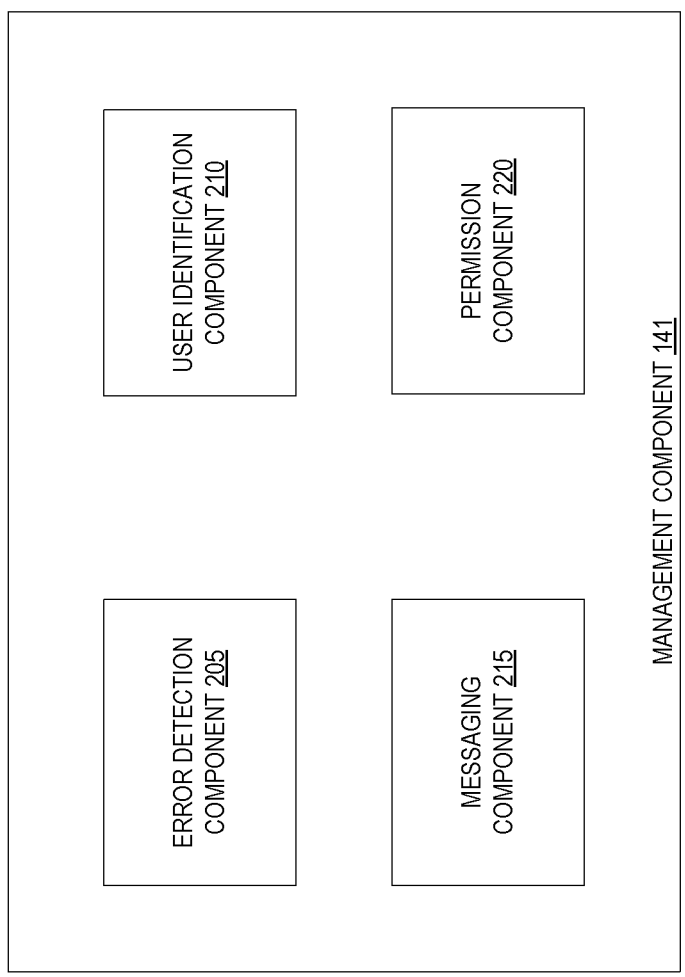
FIG. 2 is a block diagram that illustrates an example management component, in accordance with some embodiments of the present disclosure.

FIG. 2 is a block diagram that illustrates an example management component 141, in accordance with some embodiments of the present disclosure. The management component 141 includes, but is not limited to, an error detection component 205, a user identification component 210, a messaging component 215, and a permission component 220. Some or all of components 205-220 may be implemented in software, hardware, or a combination thereof. For example, one or more of components 205-220 may be installed in persistent storage device, loaded into memory, and executed by one or more processors (not shown). In another example, one or more of components 205-220 may be processing devices, such as an application specific integrated circuit (ASIC), a field programmable gate array (FPGA), etc. Some of components 205-220 may be integrated together as an integrated component. In addition, some of components 205-220 may be located in different computing devices (e.g., different server computers).

In one embodiment, the error detection component 205 may determine that one or more errors (e.g., a set of errors) have occurred in one or more applications components (e.g., applications) that are executing in virtual environments (e.g., containers, VMs, etc.). The error detection component 205 may determine that one or more errors have occurred by receiving a message (e.g., a packet, frame, or other data) indicating that the error has occurred while executing the applications and/or application components. The error detection component 205 may also determine that one or more errors have occurred by detecting and/or analyzing error logs that may be generated by the application component. The error detection component 205 may determine that one or more errors have occurred by receiving a message from another computing device and/or a user.

In one embodiment, the user identification component 210 may identify a set of users based on one or more of a set of files for the application components (e.g., source code files) and the virtual environments where the applications and/or application components are located. The user identification component 210 may identify one or more files (e.g., a set of files) for an application component, based on one or more errors that have occurred for the application component. The user identification component 210 may list of users that have edited the one or more files. The user identification component 210 may identify a set of users from a list of users that have modified one or more files based on a number of edits, an amount of edits, and/or a time period of the edits.

In one embodiment, the messaging component 215 may send (e.g., transmit) one or more messages (e.g., a set of users) to one or more users (e.g., a set of users) to indicate that one or more errors have occurred in one or more application components (e.g., to alert the users about the one or more errors). The messaging component 215 may use management data to determine which messaging system to use for different users and/or to determine contact information for the different users. For example, the messaging component 215 may use a trie data structure to identify users and/or determine contact information for the users.

In one embodiment, the management component 141 may generate and/or update the trie data structure when one or more application components 115 are generated, built, compiled, etc. For example, users may modify, update, edit, etc., files 122 to update an application component 115. The updates to the application component 115 may be to add new features to the application component 115, optimize the application component 115, fix errors, problems, bugs, etc., in the application component 115, and/or for any other purpose. When a user (e.g., a system administrator, a build master, a developer, etc.) generates (e.g., builds, compiles, etc.) the application component 115, the management component 141 may generate and/or update the trie data structure. For example, if new files 122 and/or directories have been added to the code repository 120, the management component 141 may As discussed above, permissions may allow users to access and/or modify virtual environments and/or computing devices. The permission component 220 may determine one or more permissions for accessing the virtual environments and/or computing devices, based on one or more files identified. For example, the permission component 220 may analyze the types of files that are accessed by users to determine which permissions should be granted to the users for which computing devices and/or virtual environments. In one embodiment, the permission component 220 may perform role based access control (RBAC). For example, the permission component 220 may provide/grant different sets of permissions to different users based on their role (e.g., programmer, build master, system administrator, etc.).

Figure 3:
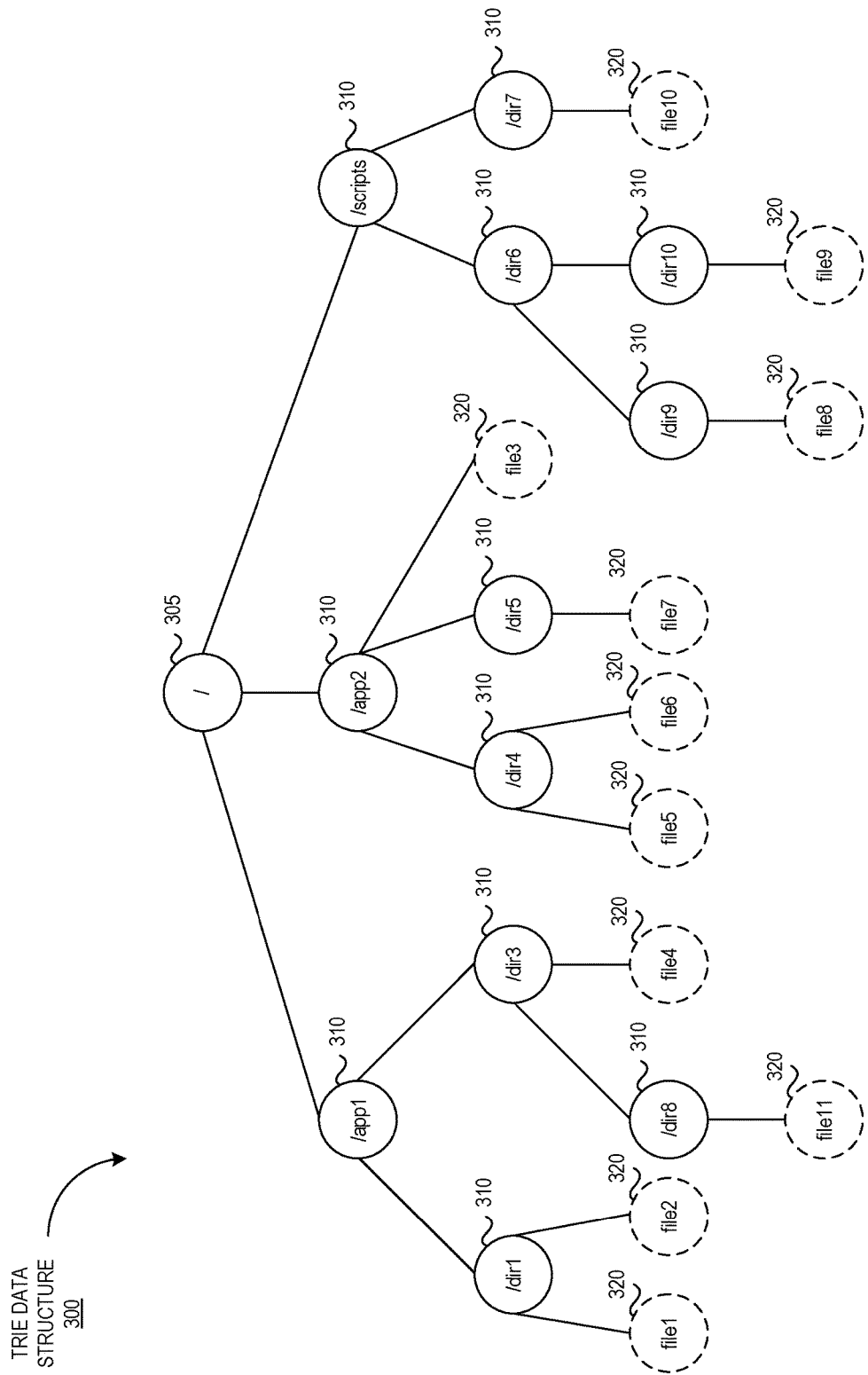
FIG. 3 is a diagram illustrating an example trie data structure, in accordance with some embodiments of the present disclosure.

FIG. 3 is a diagram illustrating an example trie data structure 300, in accordance with some embodiments of the present disclosure. The trie data structure 300 may be an ordered tree structure used to store a dynamic set of data and/or an associative array. The keys for searching the trie data structure 300 may be strings (e.g., alphanumeric values). The position of a node in the tree may define the key with which the node is associated. The trie data structure 300 may also be referred to as a digital trie, a prefix tree, a trie, a search tree, etc.

The trie data structure 300 includes node 305, nodes 310, and nodes 320. The node 305 may be a root node and main represent a root directory (e.g., "/") in a code repository (e.g., code repository 120 illustrated in FIG. 1). The nodes 310 (e.g., the solid circles) may represent directories and/or subdirectors of the root directory. For example, the node 310 labelled "/app1" may include a directory that stores other directories (e.g., sub-directories) and/or files for a first application. The nodes 310 represent the following directories labelled "/app1," "/app2," "/scripts," "dir1," "dir2," "dir3," "dir4," "dir5," "dir6," "dir7," "dir8" "dir9," and "dir10." The nodes 320 (e.g., the dashed circles) may represent files that are located within a directory. The nodes 320 may represent the files "file1," "file2," "file3," "file4," "file5," "file6," "file7," "file8," "file9," "file10," and "file11."

As discussed above, each of the nodes 305, 310, and 320 may include additional data (e.g., metadata) that may identify users who have modified the files and/or directories represented by the nodes 305, 310, and 320. For example, each node 305, 310, and 320 may include a list of users who have modified the files and/or directories represented by the nodes 305, 310, and 320.

Figure 4:
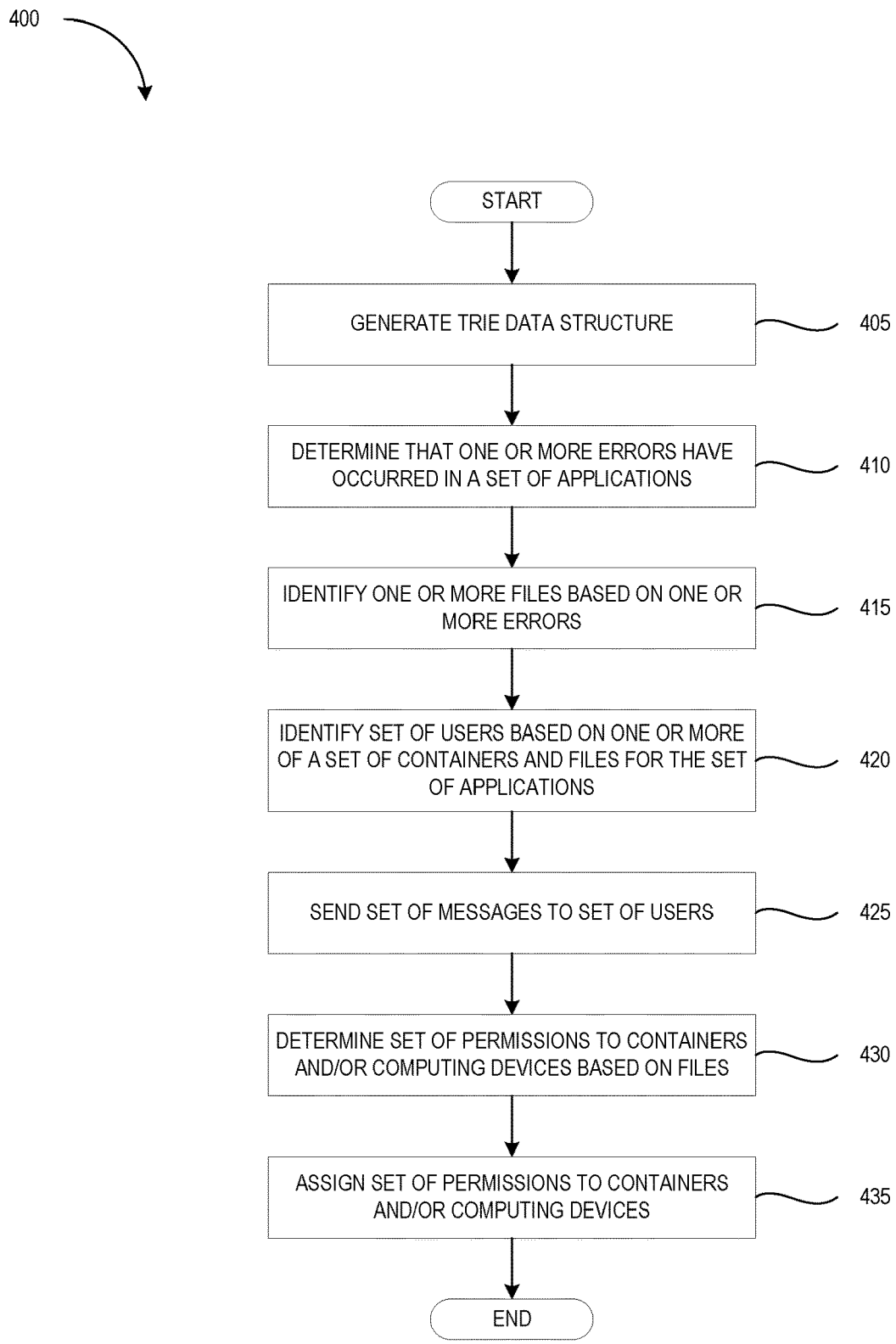
FIG. 4 is a flow diagram of a method for managing alert messages, in accordance with some embodiments of the present disclosure.

FIG. 4 is a flow diagram of a process 400 for managing alert messages, in accordance with some embodiments of the present disclosure. Process 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 400 may be performed by one or more of a computing device (e.g., computing device 140 illustrated in FIG. 1) and a management component (e.g., management component 141 illustrated in FIG. 1).

With reference to FIG. 4, process 400 illustrates example functions used by various embodiments. Although specific function blocks ("blocks") are disclosed in process 400, such blocks are examples. That is, embodiments are well suited to performing various other blocks or variations of the blocks recited in process 400. It is appreciated that the blocks in process 400 may be performed in an order different than presented, and that not all of the blocks in process 400 may be performed. In addition, additional other blocks (not illustrated in FIG. 4) may be inserted between the blocks illustrated in FIG. 4.

Process 400 begins at block 405 where the process 400 may generate a trie data structure based on the directories and/or files in a code repository, as discussed above. In other embodiments, other data structures may be used to represent the directories and/or files in a code repository. At block 410, the process 400 may determine whether one or more errors have occurred in a set of application components (e.g., applications). For example, the process 410 may determine whether log files have been generated, messages have been received, etc. At block 415, the process 400 may identify one or more files based on the one or more errors. For example, the process 400 may analyze an error log, error stack, etc., to determine which files (e.g., source code files) may have caused the errors.

At block 420, the process 400 may identify a set of users based on the set of files and/or the set of containers where the application component is executing. For example, the process 400 may identify users who have edited the files since the last time the file was used to generate (e.g., compile) the application component. At block 425, the process 400 may send one or more messages to the set of users via one or more messaging systems. The messages may alert the users regarding the errors that have occurred in the application components.

At block 430, the process 400 may determine a set of permissions for set of users to virtual environments and/or computing devices based on the files. For example, based on the type of files, the process 400 may determine which permissions should be granted to which users. At block 435, the process 400 may assign the set of permission to the containers and/or computing devices, to the set of users.

Figure 5:
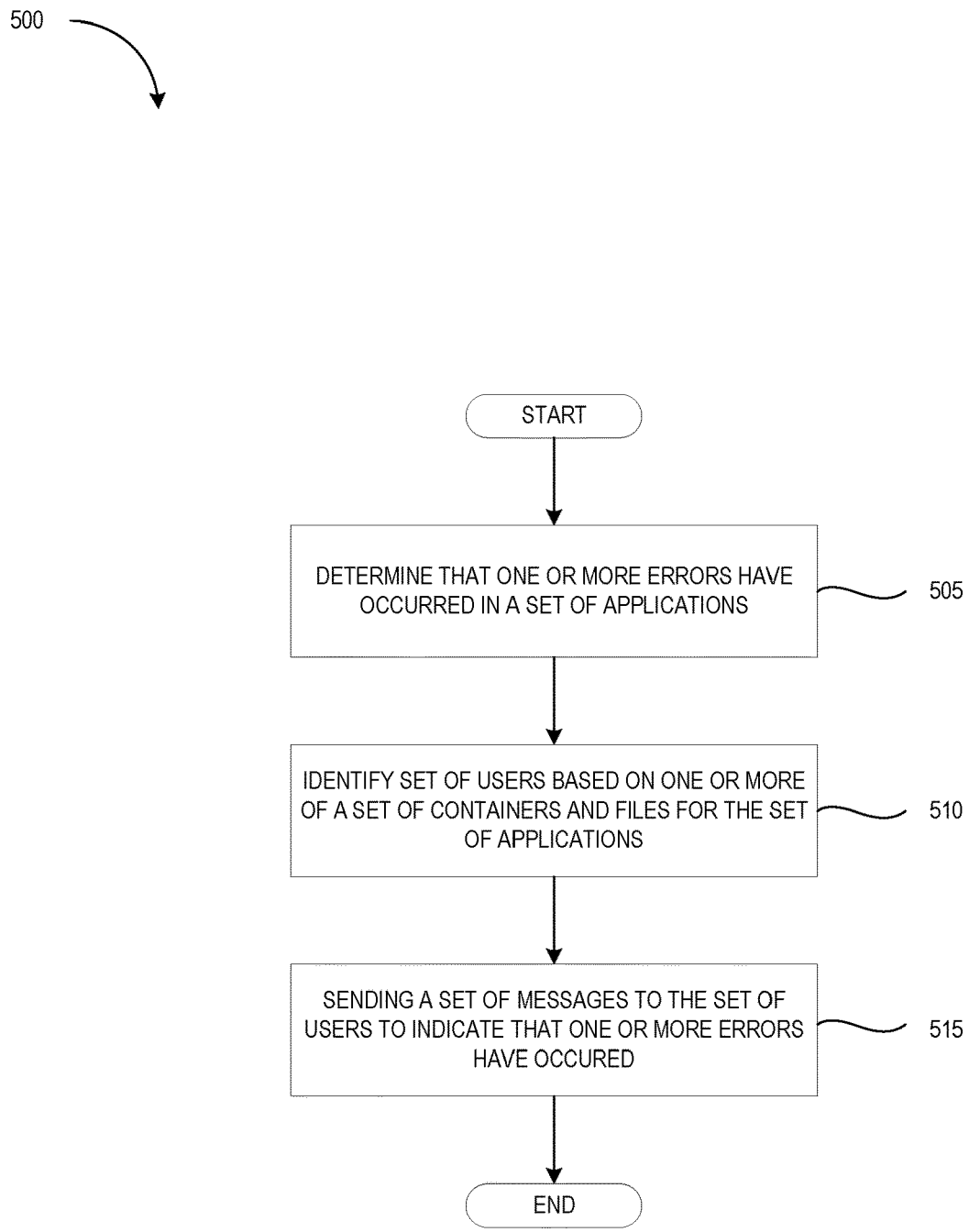
FIG. 5 is a flow diagram of a method for managing alert messages, in accordance with some embodiments of the present disclosure.

FIG. 5 is a flow diagram of a process 500 for managing alert messages, in accordance with some embodiments of the present disclosure. Process 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 500 may be performed by one or more of a computing device (e.g., computing device 140 illustrated in FIG. 1) and a management component (e.g., management component 141 illustrated in FIG. 1).

With reference to FIG. 5, process 500 illustrates example functions used by various embodiments. Although specific function blocks ("blocks") are disclosed in process 500, such blocks are examples. That is, embodiments are well suited to performing various other blocks or variations of the blocks recited in process 500. It is appreciated that the blocks in process 500 may be performed in an order different than presented, and that not all of the blocks in process 500 may be performed. In addition, additional other blocks (not illustrated in FIG. 5) may be inserted between the blocks illustrated in FIG. 5.

Process 500 begins at block 505 where the process 500 determines that one or more errors have occurred in a set of applications (e.g., application components). For example, the process 500 may detect error logs, receives messages from the applications and/or users, etc. At block 510, the process 500 may identify one or more users (e.g., a set of users) based on one or more containers and/or files (e.g., source code files). For example, the process 500 may identify source code files for an application that generated an error. The process 500 may identify users that have modified the source code file. The process 500 may send one or more messages (e.g., a set of messages) to the one or more users (e.g., a set of users) at block 515. For example, the process 500 may identify messaging systems and/or contact information for the users identified in block 510. The process 500 may alert the users regarding the errors by sending one or more messages to the users via a set of messaging systems (e.g., email systems, chat systems, text messaging systems, etc.).

Figure 6:
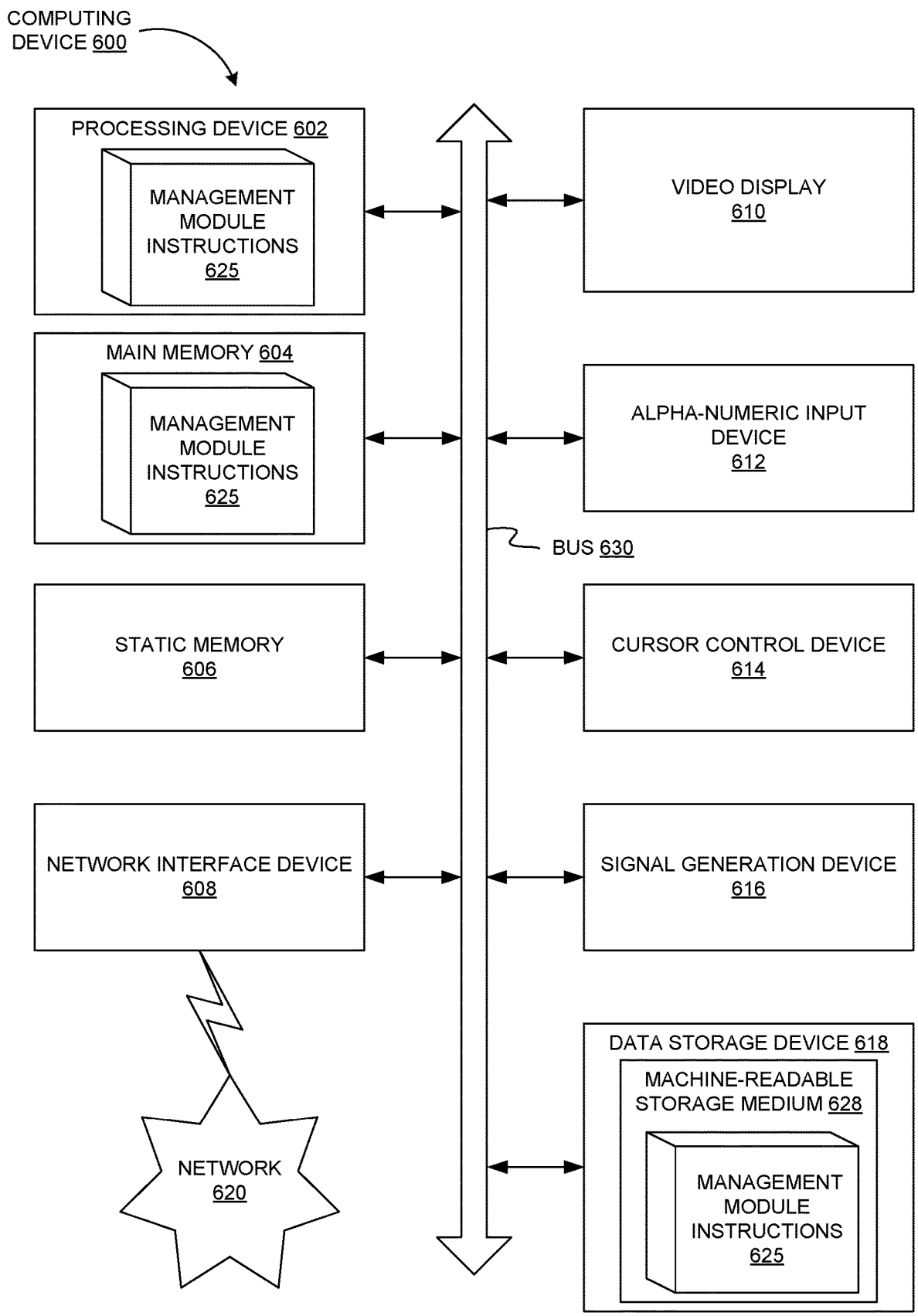
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a programmable logic device (PLD), etc.) 602, a main memory 604 (e.g., synchronous dynamic random access memory (DRAM), read-only memory (ROM)), a static memory 606 (e.g., flash memory), and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of management component instructions 625, e.g., instructions for carrying out the operations described herein, in accordance with one or more aspects of the present disclosure. Management component instructions 625 may also reside, completely or at least partially, within main memory 604 and/or within processing device 602 during execution thereof by computing device 600, main memory 604 and processing device 602 also constituting computer-readable media. The management component instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "determining," "identifying," "sending," "detecting," "receiving," "selecting," "querying," "generating," "assigning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   determining that an error has occurred in an application executing in a container, the application comprising a set of files;
   identifying one or more files of the set of files that have caused the error;
   generating an ordered tree data structure comprising nodes representing the set of files, directories, and subdirectories of a root directory, each of the nodes further comprising metadata identifying a first set of users that have modified the set of files since the application was previously generated;
   identifying a set of permissions associated with the set of files, the application, and the container;
   identifying, by a processing device, a second set of users in the first set of users based on the metadata in the ordered tree data structure, the second set of users being granted one of the set of permissions to modify the identified one or more files; and
   sending a message, associated with the ordered tree data structure, to the second set of users to indicate that the error has occurred in the application.

2. The method of claim 1, wherein determining that the error has occurred comprises detecting one or more error stacks generated by the application.

3. The method of claim 1, wherein determining that the error has occurred comprises receiving a message from an application component of the application.

4. The method of claim 1, further comprising identifying the set of files for the application in view of the error.

5. The method of claim 1, wherein identifying the second set of users comprises:
   determining the first set of users that have modified the set of files; and
   selecting the second set of users from the first set of users that have modified the identified one or more files.

6. The method of claim 5, wherein determining the first set of users that have modified the set of files further comprises
   querying a code repository for a list of users that have modified the set of files, wherein the code repository manages different versions of the set of files.

7. The method of claim 5, wherein selecting the second set of users comprises
   selecting a set of users in view of a threshold number of edits to the one or more files of the set of files.

8. The method of claim 5, wherein selecting the second set of users comprises
   selecting a set of users in view of a threshold size of edits to the one or more files of the set of files.

9. The method of claim 5, wherein selecting the second set of users comprises
   selecting a set of users in view of one or more time periods of edits to the one or more files of the set of files.

10. The method of claim 1, further comprising generating a trie data structure in view of the set of files for the application, wherein the second set of users is identified further in view of the trie data structure.

11. The method of claim 1, further comprising:
    determining the set of permissions for the container for the first set of users in view of the set of files; and
    assigning, to the first set of users, the set of permissions for the container.

12. The method of claim 11, wherein determining the set of permissions for the container for the first set of users comprises:
    determining one or more types of files of the set of files accessed by the first set of users; and
    determining the set of permissions in view of the one or more types of files.

13. An apparatus, comprising:
    a memory; and
    a processing device operatively coupled to the memory, the processing device configured to:
    determine that an error has occurred in an application executing in a container, the application comprising a set of files;
    identify one or more files of the set of files that have caused the error;
    generate an ordered tree data structure comprising nodes representing the set of files, directories and subdirectories of a root directory, each of the nodes further comprising metadata identifying a first set of users that have modified the set of files since the application was previously generated;
    identify a set of permissions associated with the set of files, the application, and the container;
    identify a second set of users, the second set of users being granted one of the set of permissions to modify the identified one or more files; and
    send a message, associated with the ordered tree data structure, to the second set of users to indicate that the error has occurred in the application.

14. The apparatus of claim 13, wherein the processing device is further configured to:
    identify the set of files for the application in view of the error.

15. The apparatus of claim 13, wherein to identify the second set of users the processing device is further configured to:

determine the first set of users that have modified the set of files; and select the second set of users from the first set of users that have modified the identified one or more files.

16. The apparatus of claim 15, wherein to determine the first set of users that have modified the set of files the processing device is further configured to:

query a code repository for a list of users that have modified the set of files, wherein the code repository manages different versions of the set of files.

17. The apparatus of claim 13, wherein the processing device is further configured to:

generate a trie data structure in view of the set of files for the application, wherein the second set of users is identified further in view of the trie data structure.

18. The apparatus of claim 13, wherein the processing device is further configured to:

identify the set of permissions for the container for the first set of users in view of the set of files; and assign the set of permissions for the container, to the first set of users.

19. The apparatus of claim 18, wherein to determine the set of permissions to the container for the set of users the processing device is further configured to:

determine one or more types of files of the set of files accessed by the first set of users; and determine the set of permissions in view of the one or more types of files.

20. A non-transitory computer readable medium having instruction stored thereon that, when executed by a processing device, cause the processing device to:

determine that an error has occurred in an application executing in a container, the application comprising a set of files;

identify one or more files of the set of files that have caused the error;

generate an ordered tree data structure comprising nodes representing the set of files, directories, and subdirectories of a root directory, each of the nodes further comprising metadata identifying a first set of users that have modified the set of files since the application was previously generated;

identify a set of permissions associated with the set of files, the application and the container;

identify, by the processing device, a second set of users, the second set of users being granted one of the set of permissions to modify the identified one or more files; and send a message, associated with the ordered tree data structure, to the second set of users to indicate that the error has occurred in the application.

* * * * *